US009880545B2

(12) United States Patent
Fadlovich et al.

(10) Patent No.: US 9,880,545 B2
(45) Date of Patent: Jan. 30, 2018

(54) SYSTEM AND METHOD FOR SELF-CONTAINED SELF-CALIBRATING MODULAR MANUFACTURING TOOL

(71) Applicant: MOBILE TOOL MANAGEMENT, INC., Mukilteo, WA (US)

(72) Inventors: Chace Howard Fadlovich, Bothell, WA (US); Robert Allen Brown, Denver, CO (US); David James Whalen-Robinson, Mountlake Terrace, WA (US); Michael Gary Woogerd, Seattle, WA (US); Eric J. Davis, Mukilteo, WA (US)

(73) Assignee: MOBILE TOOL MANAGEMENT, INC., Mukilteo, WA (US)

( * ) Notice: Subject to any disclaimer, the term of this patent is extended or adjusted under 35 U.S.C. 154(b) by 141 days.

(21) Appl. No.: 14/876,443

(22) Filed: Oct. 6, 2015

(65) Prior Publication Data

US 2017/0097628 A1    Apr. 6, 2017

(51) Int. Cl.
*G05B 19/402*    (2006.01)
(52) U.S. Cl.
CPC .. *G05B 19/402* (2013.01); *G05B 2219/41109* (2013.01); *G05B 2219/45059* (2013.01); *Y10S 901/08* (2013.01)
(58) Field of Classification Search
CPC ........ G05B 19/402; G05B 2219/41109; G05B 2219/45059; G05B 9/16; G05B 19/418;
(Continued)

(56) References Cited

U.S. PATENT DOCUMENTS 5,615,474 A * 4/1997 Kellner ............ G05B 19/41815
29/243.53
5,932,122 A * 8/1999 Hong ................... B23K 9/1272
219/124.34
(Continued)

OTHER PUBLICATIONS

Karlen et al., A Dual-Arm Dexterous Manipulator System with Anthropomorphic Kinematics, 1990, IEEE, p. 368-373.*

(Continued)

*Primary Examiner* — Mcdieunel Marc
(74) *Attorney, Agent, or Firm* — Lane Powell, PC

(57) ABSTRACT

A system and method for a self-contained self-calibrating modular manufacturing device having modular tools and parts configured to collectively accomplish a specific task or function. The modular device includes a housing that has a mount configured to engage a robotic arm or other form of maneuvering actuator (such a crane or gantry). The housing provides a base by which additional modules are mounted and coupled. The modular device also includes an interface configured to communicate with a remote control system capable of controlling the robotic arm. Such modules work in conjunction with each other to accomplish tasks and functions. In a self-contained self-calibrating modular manufacturing device, a processor disposed in the housing is configured to control the functional tools (e.g., each end-effector) independent of the overall manufacturing control system as well as use local sensors to determine aspects of an underlying manufactured items for calibration purposes.

20 Claims, 5 Drawing Sheets

(58) Field of Classification Search
CPC ..... G05B 9/1692; Y10S 901/08; H01L 21/68; H01L 21/67
USPC ........................................................ 700/245
See application file for complete search history.

(56) References Cited

U.S. PATENT DOCUMENTS

| | | | |
|---|---|---|---|
| 6,575,444 B1* | 6/2003 | Bidaud | B23K 37/0443 |
| | | | 269/152 |
| 8,225,508 B2* | 7/2012 | Houis | B21J 15/14 |
| | | | 29/407.09 |
| 9,138,894 B2* | 9/2015 | Alotto | B25J 9/161 |
| 2009/0248190 A1 | 10/2009 | Spangler | |
| 2010/0312388 A1 | 12/2010 | Jang et al. | |
| 2012/0035754 A1 | 2/2012 | Oldani | |
| 2012/0152911 A1 | 6/2012 | Diez et al. | |
| 2012/0288336 A1 | 11/2012 | Berg | |
| 2014/0230261 A1 | 8/2014 | Tait | |
| 2015/0211566 A1 | 7/2015 | Woods et al. | |

OTHER PUBLICATIONS

International Search Report & Written Opinion dated Dec. 8, 2016; Int'l Application No. PCT/US16/53023; Int'l Appl. dated Sep. 22, 2016; pp. 1-17.

\* cited by examiner

SYSTEM AND METHOD FOR SELF-CONTAINED SELF-CALIBRATING MODULAR MANUFACTURING TOOL

RELATED APPLICATION DATA

The present application is related to U.S. patent application Ser. No. 14/876,415, entitled SELF-CONTAINED MODULAR MANUFACTURING TOOL filed Oct. 6, 2015; is related to U.S. patent application Ser. No.: 14/876,508, entitled SELF-CONTAINED MODULAR MANUFACTURING TOOL RESPONSIVE TO LOCALLY STORED HISTORICAL DATA filed Oct. 6, 2015; is related to U.S. patent application Ser. No.: 14/876,564, entitled SYSTEM AND METHOD FOR SELF-CONTAINED MODULAR MANUFACTURING DEVICE HAVING NESTED CONTROLLERS filed Oct. 6, 2015; and is related to U.S. patent application Ser. No.: 14/876,603, entitled SYSTEM AND METHOD FOR SELF-CONTAINED INDEPENDENTLY CONTROLLED MODULAR MANUFACTURING TOOLS filed Oct. 6, 2015, all of the foregoing applications are incorporated herein by reference in their entireties.

BACKGROUND

As manufacturing environments become more automated and complex, robotics and other automated machinery is becoming more and more prevalent in all phases of manufacturing. Very specific tasks that are conventionally performed by a skilled artisan may be performed using highly specialized robotics having highly specialized tools and/or end effectors. For example, drilling holes in composite sections of a contoured section of an airplane wing or car body may require a high level of precision with respect to applying torque to a motor for moving the end effector around a contoured wing surface. A further example is the need to tightly control the actuation force applied to the wing section by the drill bit in order to avoid compromising the wing itself.

In conventional manufacturing environments, various end-effectors and other tools that are used to accomplish various functions are simply controllable tools that are mounted to the end of a robotic arm or other form of actuator such that a central control system controls end-effectors according to a master logic program or state machine. That is, the tool itself does not contain any manner of processing ability such that the tool may be deemed to be a "smart tool" capable of directing its own functions in a self-contained manner. Rather, conventional systems include master programs that exhibit control functionality to tools through control signal communications propagating through robotic arms and actuators. In such a conventional environment, lack of localized processing and control imposes large processing speed and power requirements on the master control system.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
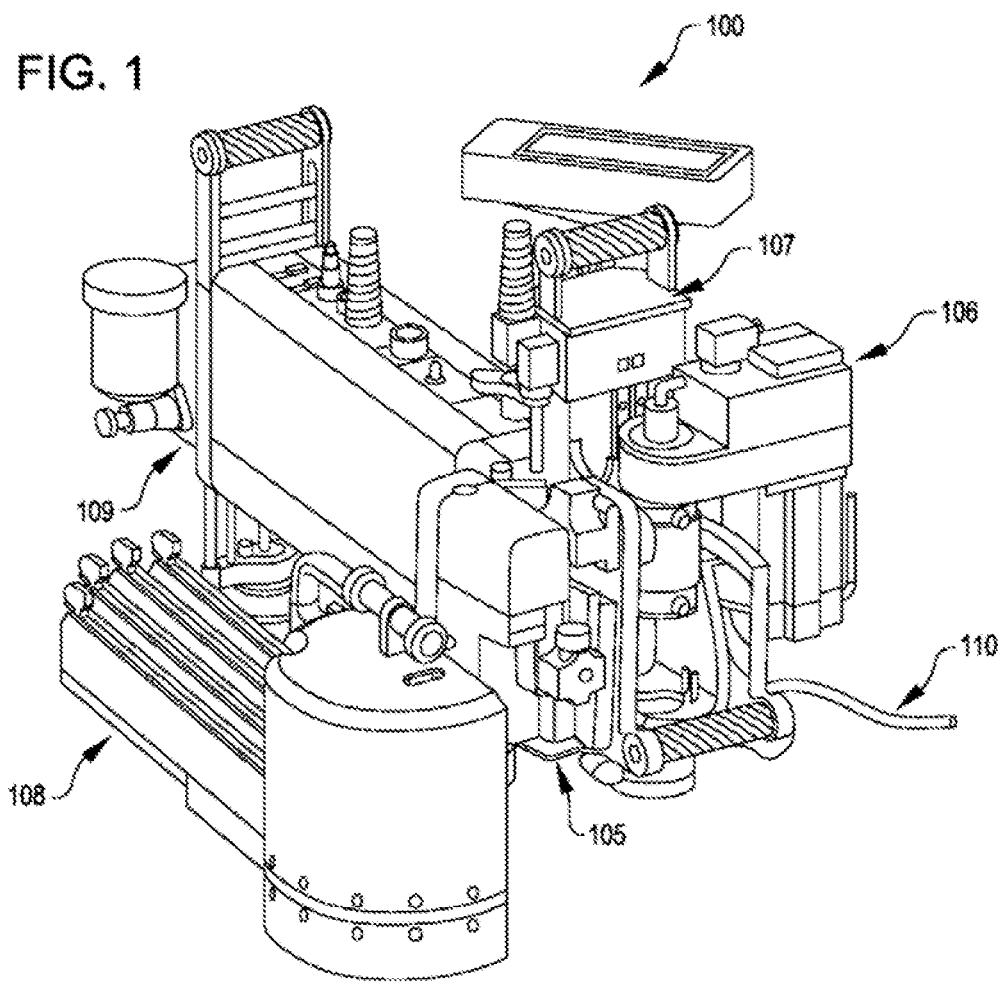
FIG. 1 shows an isometric view of a set of modular tools forming a self-contained self-calibrating modular manufacturing device having a local processor for executing processing instructions independent of an overall manufacturing control system according to an embodiment of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

The subject matter disclosed herein is directed to a system (and method for use thereof) of a self-contained modular manufacturing device having modular tools and parts configured to collectively accomplish a specific task or function. In an embodiment, the modular device includes a housing that has a mount configured to engage a robotic arm or other form of maneuvering actuator (such a crane or gantry). The housing may provide a base by which additional modules may be mounted and coupled. The modular device also includes an interface configured to communicate with a remote control system capable of control the robotic arm. The modular device also includes one or more other modules that are configured to accomplish a particular task or function. Such modules are sometimes called end-effectors and work in conjunction with each other to accomplish tasks and functions. In a self-contained modular manufacturing device, a processor disposed in the housing may be configured to control the functional tools (e.g., each end-effector) independent of the overall manufacturing control system. Further, the self-contained modular manufacturing device may be configured to calibrate itself with respect to other attached modules or with respect to an underlying manufactured item.

As foreshadowed in the background, a conventional robotic manufacturing system may include arm and actuators to which are attached end-effectors and other tooling. Under a master control system or master control operator, the robot arm may move the end effector into position where the end effector performs the actual machining or assembly of the parts. For example, to fasten two pieces of metal together, a human operator loads the two pieces of metal into the tooling, and, after the operator retreats to a safe distance from the robot, the operator pushes a button, or otherwise indicates to the robot that the robot can begin the fastening process. Then, under the control of the master control system, the end-effector drills one or more holes through the two pieces of metal, inserts fasteners (e.g., rivets) into the holes, and installs the fasteners. During the fastening operation, the robot may move the end-effector from hole position to hole position, or the robot may be installed on a device (e.g., a rail) that moves the robot from hole position to hole position. Alternatively, the tooling may move the two pieces of metal relative to the end effector, or may be installed on a device (e.g., a rail or Automatic Guided Vehicle (AGV)) that moves the tooling. After the two pieces of metal are fastened together, the operator removes the fastened pieces from the tooling, and repeats the above procedure starting with loading another two pieces of metal into the tooling.

Alternatively, where the pieces (e.g., pieces of an airplane wing) are too large to be moved by a human operator, they may be moved and loaded into the tooling with machinery (e.g., heavy equipment), or the robot may be moved to the location of the pieces instead of the pieces being moved to the location of the robot.

The robot and the end effector, in a conventional system, are controlled by a master control system and often through a central Programmable Logic Controller (PLC). The PLC executes a software program to directly control all of the operations of the robot and the end effector, and to store information regarding the robot and end effector. For example, to drill a hole, the PLC may access and execute a drill-hole software subroutine or object (or the PLC may be a state machine) that causes the PLC to generate one or more electrical analog or digital signals that are coupled to the end effector. These signals (e.g., drill on/off, drill speed, drill extend/retract) cause the drill motor to rotate the drill bit at a desired speed and to drill a hole. And the PLC may receive feedback signals (e.g., drill depth, drill speed) from feedback sensors so that the PLC can operate the items (e.g., drill) of the end effector in open loop or closed loop. The PLC may also receive monitoring signals (e.g., temperature) from sensors so as to take corrective action if there is a problem (e.g., overheating, short circuit).

But there are disadvantages to such a central control system. Because the PLC controls all operations of the robot and end effector, the software program (or state machine) that the PLC executes may be long, complex, unwieldy, and difficult and time consuming to update. For example, suppose a small change or update needs to be made to the drilling subroutine. A programmer may need to access, modify, recompile, debug, and reinstall the entire program just for this small change. And the debug may include testing the program on the entire manufacturing system, not just on the end effector, so that either the entire manufacturing system is down during this software update, or a separate robotic system or robot-system emulator needs to be purchased and maintained just for software updates.

Furthermore, because the PLC needs to generate many analog or digital signals to control the end effector, the connector (e.g., "umbilical cord") between the PLC and the end effector may be large and complex, and, due to the number of individual connections, may be unreliable. For example, such a connector may have from tens to hundreds of individual connection pins and receptacles. Moreover, because the PLC needs to calibrate the end effector, swapping out an end effector is anything but trivial. For example, the PLC may calibrate open-loop offsets (e.g., previously calculated and stored drill-position offset, camera-position offset) based on a look-up table (LUT) that is unique to the end effector. For example, the PLC may match a serial number of the end effector with the proper LUT to make sure that the PLC is using the correct calibration offsets for that particular end effector. Therefore, when swapping out an end effector, the maintenance person may need to load the calibration data for the end effector into an LUT of the PLC. Even if it is relatively easy to load the calibration data into an LUT, this still presents an opportunity for error that may go undiscovered until one or more parts are machined or assembled out of specification.

In addition, because the end effector is designed as an integral unit, repairing the end effector may entail removing and shipping the entire end effector back to the equipment supplier even to diagnose a failure in, and to change, a relatively small part. To avoid down time, this means that the manufacturing system that is using the robotic control system may need to keep one or more spare end effectors on hand to swap out a broken end effector. Because end effectors are relatively expensive, this adds significant cost to the manufacturer that uses the robot system under a master control system.

Furthermore, to perform any tests on the end effector (e.g., a test after repair or after a software update), the tester must have an entire robot system, or at least a robot-system emulator. This adds expense, and may require a large space because the robot is typically large.

Various embodiments of the inventive self-contained modular manufacturing device address these disadvantages by providing a system and method of handling control aspects and calibration aspects of the end-effector using a modular device having a dedicated processor for controlling the actions of the end-effector in a self-contained manner. In this aspect, problems associated with bulky and remote master control system are eliminated. Further, the modularity of the various portions of the overall manufacturing system is increased thereby reducing downtime and repair costs. These and other aspects of the subject matter disclosed herein are better understood with respect to the descriptions of FIGS. 1-5 below.

FIG. 1 shows an isometric view of a set of modular tools forming a self-contained modular manufacturing device 100 having a local processor for executing processing instructions independent of an overall manufacturing control system according to an embodiment of the subject matter disclosed herein. The modular device 100 may include several modules 105-109 that are designed to interface with one or more other modules 105-109 within the modular device 100. In this manner, the set of modules 106-109 function as one device 100 within the larger context of a manufacturing control system. Further, each module 105-109 may include its own dedicated processor (not shown in FIG. 1) for controlling aspects of the functions of the individual module. In other embodiments, the modular device 100 may include its own local controller with several nested controllers embedded within dependent modules. In still further embodiments, each module 105-109 may be controlled by a single local processor embedded within one of the modules 105-109. For the purposes of this disclosure, the example embodiment having one local processor for controlling the aspects of each of the five modules 105-109 is discussed. Other embodiments may be the subject of related disclosures focused on nested controllers and the like.

Thus, in this embodiment, there are five modules 105-109 that collectively form a self-contained modular manufacturing device 100 that is a fastener delivery and actuating tool 100. This will be the example embodiment that is discussed throughout the remainder of this disclosure, but the skilled artisan understands that there can many several other examples of self-contained modular manufacturing device 100. The five modules 105-109 of the modular device 100 include an x-y-axis motion-actuator assembly 105 (hidden from view in FIG. 1—see FIG. 2 for greater detail), a motor-spindle assembly 106, an end-effector assembly 107 (as shown in FIG. 1, a fastener torque assembly), a y-axis carriage assembly 108, and a fastener-delivery assembly 109. Collectively, these five modules 105-109 may be controlled by one or more self-contained processors (not shown in FIG. 1) embedded in one or more of the five modules.

The self-contained processor may include programming with executable routines and sub-routines for controlling each of the modules 105-109. For example, a first subroutine may be programmed for maneuvering the modular device along an x-axis rail (by controlling the x-y-axis motion-actuator assembly 105, and along a y-axis rail (by controlling the x-y-axis motion-actuator assembly 105 and the y-axis carriage assembly 108). A second subroutine may be programmed for selecting and delivering a specific fastener using the fastener-delivery assembly 109. A third subroutine may be programmed to control the motor-spindle assembly 106 to apply the appropriate drive force to the end-effector assembly 107. Lastly, a fourth subroutine may be programmed to control the end-effector assembly 107 to apply the appropriate torque to the fastener that has been selected. Additional subroutine may also assist with the overall control of the self-contained modular manufacturing device 100.

The self-contained modular manufacturing device 100 may also communicate with a master control system as well. In this sense, the self-contained modular manufacturing device 100 may hand off control to a master control system until appropriate times and then be handed local control at the self-contained modular manufacturing device 100 so that the specific functionality of the device 100 can be accomplished, Such a back and forth nature is often called a control handshake wherein a master control system need not be aware of what the self-contained modular manufacturing device 100 is doing—rather the master control system need only be aware that the self-contained modular manufacturing device 100 is doing its thing.

Such communication may be realized through an umbilical cord 110 having a communication link, such as RS-232 or standard Ethernet. Further, the umbilical cord 110 may also have cabling for power to the various modules 105-109 of the self-contained modular manufacturing device 100. In another embodiment, communication between the self-contained modular manufacturing device 100 and a master control system may be realized through wireless communications using common wireless communication protocols such as IEEE 802.11 and the like. Further, such a wireless embodiment may also include self-contained battery power such that any need for an umbilical cord 110 is eliminated. Additional details about each module 105-109 in the self-contained modular manufacturing device 100 are presented next with respect to FIG. 2.

Figure 2:
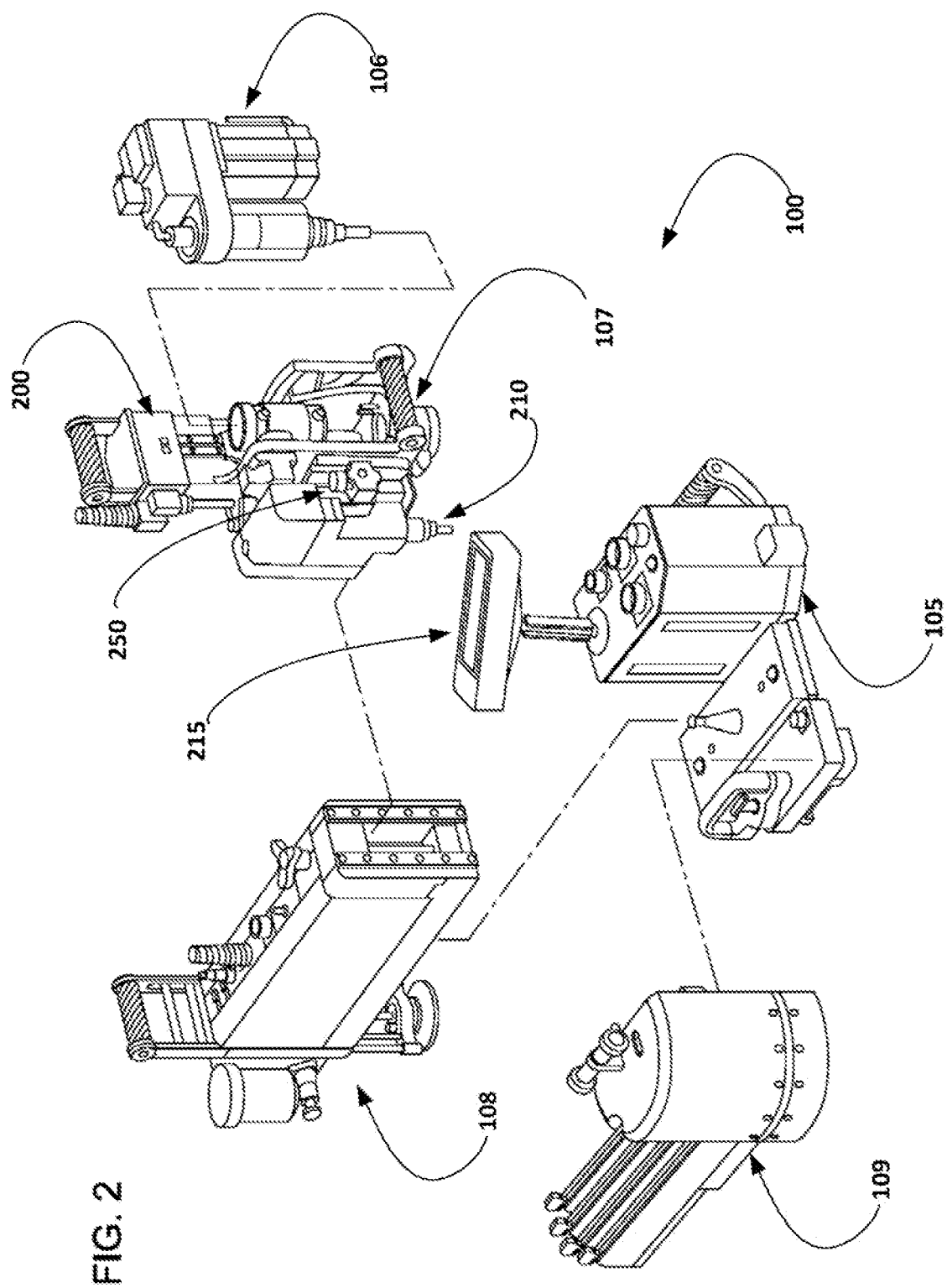
FIG. 2 shows an exploded diagram of the isometric view of FIG. 1 showing the set of modular tools that form the self-contained self-calibrating modular manufacturing device of FIG. 1 according to an embodiment of the subject matter disclosed herein.

FIG. 2 shows an exploded diagram of the isometric view of FIG. 1 showing the set of modular tools that form the self-contained self-calibrating modular manufacturing device 100 of FIG. 1 according to an embodiment of the subject matter disclosed herein. This exploded view also shows each of the five modules 105-109 from the example embodiment discussed above. As mentioned before, these modules include an x-y-axis motion-actuator assembly 105, a motor-spindle assembly 106, an end-effector assembly 107, a y-axis carriage assembly 108, and a fastener-delivery assembly 109. Collectively, these five modules 105-109 may be controlled by a self-contained local controller 200 embedded in one of the five modules; in this case the local controller 200 is embedded in the end-effector assembly 107. Thus, the local controller 200 may be a processor programmed to include routines and subroutines (which may be stored in a local memory not shown in FIG. 2) for controlling each of the modular sections of the self-contained modular manufacturing device 100.

The modular device may include an x-y-z drive system that may include one or more drive assemblies for actuating an end effector to an x-direction, a y-direction and a z-direction. For example, the modular device 100 may include an x-y-axis motion-actuator assembly 105, (for example, a screw-type drive assembly) that translates the end-effector 107 relative to a mount (such as a robot arm) in an x-direction and in a y-direction. Further, the modular device 100 may include a y-axis carriage assembly 108, (again for example, a screw-type drive assembly) that carries the end-effector 107 relative to the mount in the y-direction. Further yet, the modular device 100 may include a z-axis motion-actuator assembly (not shown in FIG. 2) that translates the end-effector 107 relative to the mount in a z-direction. Alternatively, one or more drive assemblies may translate the end-effector 107 in only one or two dimensions.

Additionally, one or more sensors 250 may be disposed on the modular device 100 and communicatively coupled to the local controller 200 to provide feedback signals to the local controller 200 so that the local controller 200 can control various items via a closed loop control path. For example, a sensor may sense the x position of the x-y-z drive assembly such that the local controller 200 can stop movement of the drive in the x direction when the x-y-axis actuator assembly 105 attains the desired x-position. The sensors 250 in conjunction with the local controller may calibrate the overall modular device 100. Such a calibration routine is described further below.

The drive assemblies may be controlled by the local controller 200 to position the end-effector 107 in a position to accomplish its underlying function; in this case, the underlying function is to fasten one piece of metal to another piece of metal using a selected fastener. Thus, the local controller 200 may execute a sub-routine for positioning the end-effector 107 at a precise location with respect to the first and second pieces of metal. Further, the various drive assemblies that are part of the modular device 100 may be used for granular positioning while the local controller 200 may be in communication with a robotic arm to which the modular device 100 is mounted in order to control broader movement. For example, the local controller 200 may send signals to a robotic arm to move the modular device 100 to a general location, but then use the drive assemblies such as modules 105 and 108) within the modular device 100 to move the end effector to a precise location. The precision maneuvering may also be accomplished in conjunction with signals received from one or more sensors 250.

The end-effector 107 may further include a tool selection assembly such as a turret module 210 that is configured to position different tools or end-effectors that may be attached to the turret module 210 into a working position or other position. In other embodiments, the tool selection assembly may be a linear selection device. Further yet, the tool selection assembly may be a combination of different tool selection devices. Examples of end-effectors that can be attached to the turret module 210 include a drill assembly, a camera assembly (to image, e.g., a drilled hole for analysis), a hole-depth determiner, a counter-sink-depth determiner, a fastener inserter, and a fastener installer. The turret module 210 may include a motor that rotates the turret to position a selected one of the tools in a work or other position, such as positioning the drill to drill a hole.

The modular device 100 of FIG. 2 includes a fastener-delivery assembly 109 that may include a fastener-orientation mechanism that can properly orient and load fasteners for use at the end-effector 107. The fastener-load mechanism may receive from the master-controller 200 information identifying the size of the fastener to be delivered, or the mechanism may effectively be able to determine the size without input from the local controller 200. Moreover, the tools on the turret module 210 may themselves be modular and self-contained with a controller. For example, one may be able to replace the drill, which includes a spindle motor assembly 106 and local motor controller (not shown), independently of the other tools in the overall modular device 100. The modular device 100 of FIG. 2 includes a human-machine interface 215 configured to provide a graphic user interface for local programmatic control of the device independent of the master control system.

In general, the end-effector assembly 107 includes a local controller 200 that, e.g., handles communications to/from the master control system and that controls one or more next-level sub-controllers within the modular device 100. For example, the local controller 200 may execute software that translates commands from the master control system into control signals or commands to sub-controllers in the end effector, assembly 107 or other assemblies in the modular device 100 and that translates commands from the various sub-controllers to the master control system. Such simple commands from the local controller 200 may simply be to begin the modular device function such that control is relinquished to the local controller 200 for accomplishing said function. Then, after said function is complete, the local controller 200 may communicate to the master control system that said function is complete and that control is relinquished back to the master control system.

In a self-calibration mode, the local controller 200 may be used to control motion actuators (such as x-y-axis actuator assembly 105) in conjunction with signals from one or more sensors 250 in order to determine an optimal position for accomplishing an underlying function. For example, the sensor 250 may be a laser detector configured to determine a distance from the functional tip of an end effector to the surface of an underlying manufactured item. In this respect, the sensor 250 is configured to sense an aspect (i.e., distance from end-effector) of an underlying manufactured item (i.e., an airplane wing). In response to sensing this aspect, the local controller 200 may control the x-y-axis actuator assembly 105 or an attached robotic arm to further maneuver the end-effector assembly 107 to a function position with respect to the underlying manufactured item. Thus, once the end-effector 107 is close enough to the underlying manufactured item, the local controller 200 may use one or more sensors 250 to calibrate a final position independent of any master control system.

There are several different embodiments possible for self-calibration using the modular device 100 having a local controller 200 with one or more sensors 250. In a first set of different embodiments, the aspect that is sensed may be one or more of several different aspects. For example, the aspect sensed may be the kind of material of which the underlying manufactured item is made, such as metal, plastic or the like. Thus, a particular force for the function may be calibrated according to the sensed material. As another example, the aspect sensed may be a depth or diameter of a hole in the underlying manufactured item. Thus, the local controller 200 may calibrate the length and size of a fastener to use in the hole. Further yet, the aspect sensed may simply be the presence of a, edge, hole, or joint between two members such that the maneuvering of the end effector is calibrated to the sensed edge, hole, or joint.

In another set of embodiments, the one or more sensors 250 may be one or more of several different types of sensors. In one embodiment, the sensor 250 is a laser measuring device suited to measuring distances and dimensions. In another embodiment, the sensor 250 is an ultrasonic measuring device suited to measure distances and dimensions. In yet another embodiment, the sensor 250 may be an infrared sensor suited to detect temperature differences. Other sensors include imaging devices, load sensors, pressure sensors, angular measuring devices, temperature sensing devices, and proximity sensing devices.

In another set of embodiments, information about the signals from one or more sensors 250 may be stored in a local memory (not shown in FIG. 2) associated with the local controller 200. This calibration information may be used in future uses of the modular device 100. For example, the modular device 100 may be used in a first manufacturing setting for riveting portions of an airplane wing together. After going through a first calibration procedure, the functionality of the end-effector may be "dialed in" (e.g., calibrated) for use in this setting with a specific underlying manufactured item (e.g., the airplane wing). Then, the modular device 100 may be swapped out on the line for a different modular tool, but then returned again later. Instead of having to calibrate the returned modular device 100 again, the stored calibration information may simply be retrieved from the local memory by the local processor 200. Further, if the modular device is used elsewhere in between, new calibration information may be set and used again as well in the new setting. Thus, regardless of where the self-contained self-calibrating modular device 100 is deployed, it may calibrate itself to its new setting or retrieve previous calibration information if the setting has been calibrated by this device 100 in the past.

There are several advantages realized in a self-contained self-calibrating modular system of FIGS. 1 and 2. First, the master control system, which is often a PLC, may have programming instructions that can be shortened and simplified as various commands to and from a coupled modular device 100 need only be minimal. Further, such PLC instructions at the master control system level need to be modified (or tested, debugged, and reinstalled) at all when software/firmware on board the modular device 100 is modified.

Second, the PLC of the master control system can send commands to the modular device 100 instead of analog or digital signals. This allows the connector 110 (e.g., "umbilical cord") between the PLC and the modular device to be reduced to incorporating an Ethernet connection (e.g., CAT 6) and a power connection. By reducing the number of individual connections, the connector is smaller, less complex, and more reliable. Additionally, the modular device 100 may run from 110 VAC instead of a specialized supply voltage like 408 VDC.

Third, the modular device 100 may store its own calibration data and may calibrate itself independently of the PLC of the master control system. This relieves the PLC memory of the burden of storing a calibration LUT for each possible modular device 100 in the system, and also eliminates the need to update such various LUTs when a modular device 100 is switched out. That is, swapping out an end-effector assembly 107 is now transparent to the PLC of the master control system because it requires no updates to the PLC software or stored calibration/configuration data.

Fourth, because the modular device 100 is designed as a modular unit, repairing the end-effector assembly 107 or other assembly in the modular device 100 entails shipping only the defective module back to the equipment supplier. This means that to avoid down time, the entity using the modular device system may need to keep only spare modules, not entire spare robots on hand to swap out with a broken or defective assembly or module. Furthermore, tests (e.g., a test after repair or after a software update) can be performed on the end-effector assembly 107 independently of the remainder of the robot system. Therefore, the tester need not have an entire master robot system or a robot-system emulator.

Figure 3:
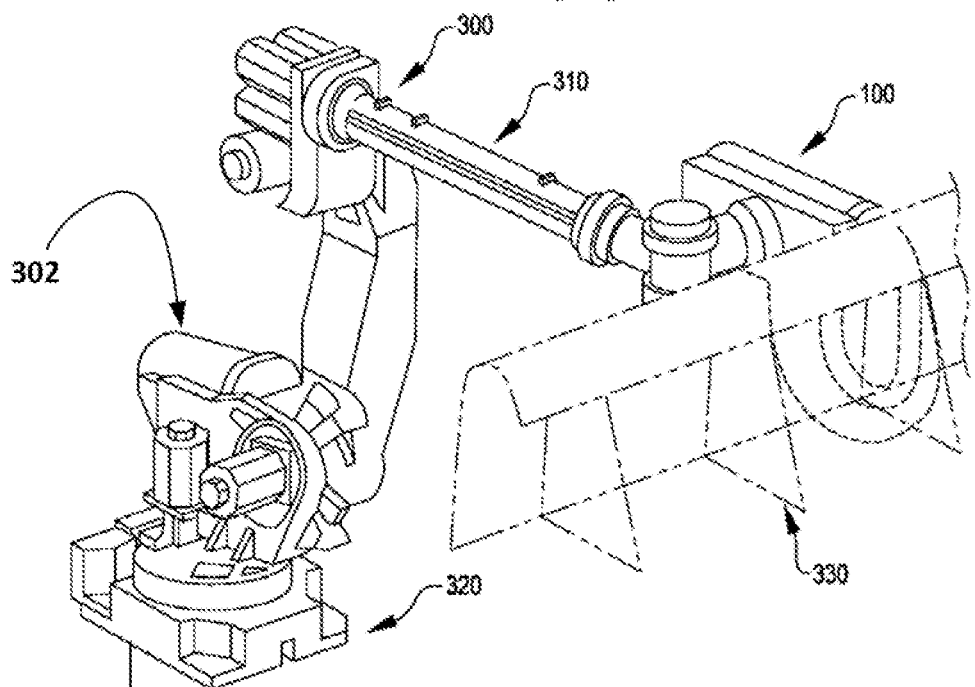
FIG. 3 shows an isometric view of an overall control system set in a manufacturing environment that includes the self-contained self-calibrating modular manufacturing device of FIG. 1 according to an embodiment of the subject matter disclosed herein.

FIG. 3 shows an isometric view of an overall robotic control system 300 set in a manufacturing environment that includes the self-contained modular manufacturing device 100 of FIG. 1 according to an embodiment of the subject matter disclosed herein. The system 300 includes a master control system 301 that may be a PLC or other programmable processor that is configured to control various robotic and automated subsystems within the overall robotic control system 300. In FIG. 3, only one subsystem 302 is shown for simplicity, but a skilled artisan understands that the system 300 may include multiple subsystems.

The subsystem 302 shown in FIG. 3 shows a robotic stanchion 320 that has a robotic arm 310 mounted in a movable manner to the robotic stanchion 320. Thus, under control of the master control system 301, the robotic arm may be maneuvered in several directions and degrees of freedom to place a mounted modular manufacturing device 100 into a position near an underlying manufactured item, such as the ribbed structure 330 shown in FIG. 3. In an embodiment, the self-contained self-calibrating modular manufacturing device 100 may take control of the robotic arm 310 if control is relinquished by the master control system 301. Such a control handshake is described above and not repeated in detail here. Thus, under control of the local controller 200, the robotic arm 310 may be controlled and maneuvered within the context of a calibration procedure.

Figure 4:
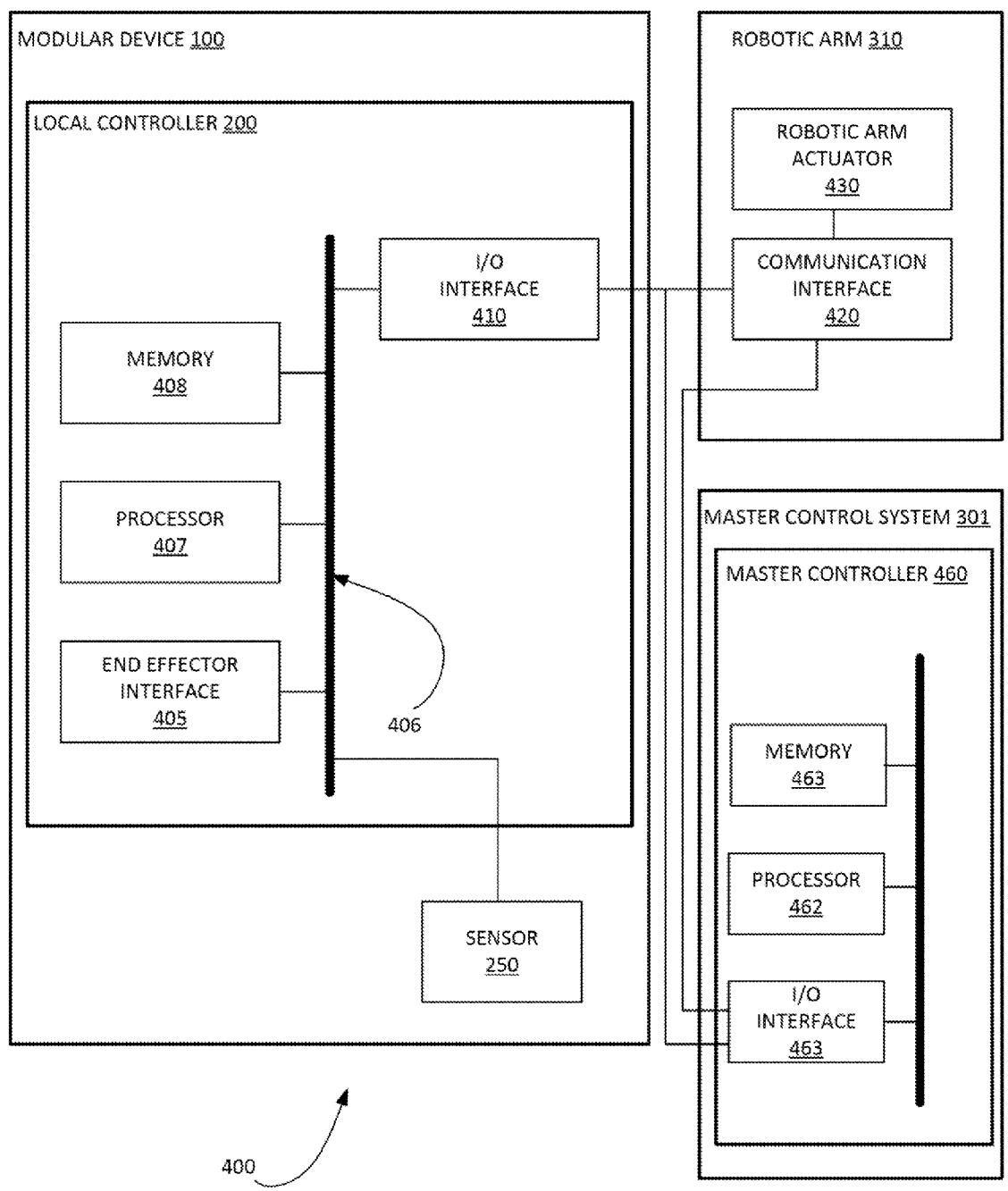
FIG. 4 shows a block diagram of an overall control system set in a manufacturing environment that includes the self-contained self-calibrating modular manufacturing device of FIG. 1 according to an embodiment of the subject matter disclosed herein.

FIG. 4 shows a block diagram of the system 300 of FIG. 3 set in a manufacturing environment that includes the self-contained modular manufacturing device 100 of FIG. 1 according to an embodiment of the subject matter disclosed herein. In this block diagram, the self-contained modular manufacturing device 100 includes the local controller 200 described above for controlling actions and functions of the self-contained modular manufacturing device 100 and, at times, the robotic arm 310. The local controller includes a processor 407 configured to execute instructions that may be stored in a local memory 408. The memory 408 is coupled to the processor via a communication and data bus 406 and may be further configured to store calibration data determined by the processor 407 when signals from an attached sensor 250 are used during a calibration procedure. The bus 406 is also coupled to one or more interfaces 405 for one or more end-effectors. In other embodiments, the interface 405 may be for coupling additional modular devices (not shown) or other devices in a nested controller manner. The self-contained modular manufacturing device 100 includes a sensor 250 that may be communicatively coupled to the bus in the modular device controller 200.

The modular device controller 200 also includes an input/output interface 410 suitable for handling communication signals to and from other related manufacturing devices and controllers in the system 300. In this embodiment, the I/O interface 410 is communicatively coupled to a communication interface 420 housed within the robotic arm 310. In other embodiments, the communication interface 420 may be within a stanchion 320 of the robotic arm as shown in FIG. 3 or may be in direct communication with the master control system 301. The communication protocol for these devices may be standard Ethernet using TCP/IP protocol. Other embodiments may be a proprietary communication protocol, such as a proprietary "Smart Tool Protocol" (STP), using TCP/IP Ethernet or other standard serial or parallel interfaces (e.g., RS-232 or the like).

The communication interface 420 associated with the robotic arm may be coupled to one or more robotic actuators configured to move the robotic arm 310 in one or more direction or orientations (such as pivoting or rotating). The master control system 301, in turn, may include a master controller 460 that includes an I/O interface 461, a processor 462 and a memory 463 for accomplishing master control tasks and functions. Various methods may be realized using the system 300 of FIG. 3 which is exemplified in the block diagram of FIG. 4; an embodiment of one method is described next with respect to FIG. 5.

Figure 5:
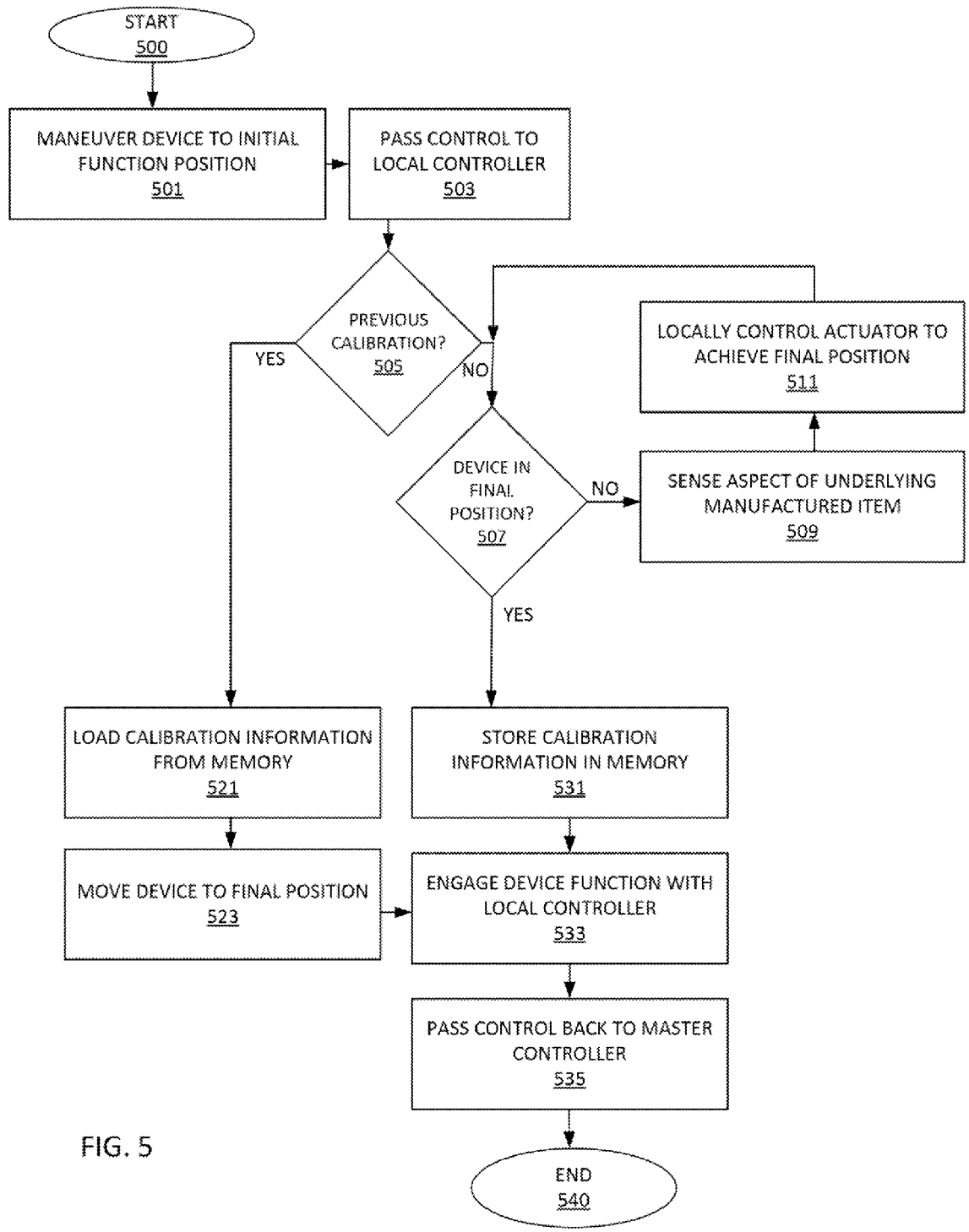
FIG. 5 shows a flow diagram of a method for calibrating the self-contained self-calibrating modular manufacturing device of FIG. 1 according to an embodiment of the subject matter disclosed herein.

FIG. 5 shows a flow diagram of a method for calibrating the self-contained modular manufacturing device 100 of FIG. 1 according to an embodiment of the subject matter disclosed herein. The method described with respect to the flow diagram of FIG. 5 is for calibrating a modular device 100 for the first time, but may be generally applicable to any setting in need of a calibration procedure. The order and number of steps, and the steps themselves, may be different in other embodiments.

The method begins at step 500 and proceeds to a first step 501 wherein an underlying manufactured item may be ready to have a function performed on the item by the modular device 100. Thus, the underlying manufactured item may have been moved into a ready position, or the robotic arm system hosting the modular device 100 may be moved to a general area near the underlying manufactured item. That is, the modular device 100 may be roughly near where the function is to be performed. In this step 501, the master controller 460 of the master control system 301 may cause a robotic arm actuator 430 to move an attached modular device 100 into closer proximity to the underlying manufactured item 330. This maneuvering may be a further refinement to the positioning that is assumed in step 501. In one embodiment, this method step 501 positions the modular device 100 in a final position for the function to be accomplished. In other embodiments, the positioning controlled by the master controller 460 is merely a rough estimate of the final position such that further calibration is needed.

Once this initial positioning has been accomplished, functional control of the overall system is passed to the local controller 200 that is part of the modular device 100 at step 503. In one embodiment, this also means that the local controller 200 may assume control of the actuator or set of actuators of any robotic arms to which the modular device 100 is mounted. Thus, the local controller 200 may maneuver the modular device 100 into a final position. At step 505, the local controller 200 determines if any previous calibration information had been stored in any local memory. If previous calibration information does exist, the local controller may then follow the yes branch of this decision step 505 to then load the calibration information from memory at step 521. Once the previously stored calibration information is loaded, the local processor 200 may control various motion actuators to maneuver the modular device into the already calibrated final position at step 523. Once in final position, the local controller may engage then perform the function at step 533.

If, however, at decision step 505, there is no calibration information stored in the local memory, the no branch is followed to step 507. At step 507, the local controller 200 determines if the modular device 100 is in a proper final position and ready for engaging the functionality of an attached end-effector 107. If not in final position, a control loop maneuvers the modular device 100 into final position via the local controller 200. After this iterative calibration procedure, the final calibration information may be stored in the local memory 408 at step 531.

Once in final position and new calibration information has been saved, the local controller 200 engages the functionality at step 533 (e.g., drills a hole, measures a drilled hole, rivets metal, or the like). Further, this step may entail retrieving and loading additional calibration information about the function from the local memory 408 prior to engaging the function. Further yet, information and data about the performing of the function may be stored in the local memory 408 after accomplishing the function. Lastly, in this step 533, the local controller 200 may then indicate to the master controller 460 that the function has been accomplished. Once the function is accomplished, functional control of the overall system may be passed back to the master controller 460 at step 535 such that the local controller reverts back to a ready state awaiting permission to accomplish the next task.

Once all functions have been accomplished, the method ends at step 540. Additional steps may be added in other embodiments, such as additional control handshakes with nested controllers as well as multiple functions at the same position, such as drilling and measuring a hole. Further, the steps of this method need not be performed in exactly the order depicted in FIG. 5 and some steps may be omitted. The above example is just one illustrative example out of many illustrative examples.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A modular tool, comprising:
   an actuator mount configured to removably engage an actuator suited to maneuver any modular tool coupled thereto;
   an interface configured to communicate with the actuator;
   an end-effector disposed in the modular tool and configured to accomplish a manufacturing function, the end-effector further including a sensor configured to sense an aspect of an underlying manufactured item to which the manufacturing function is performed; and
   a local controller disposed in the modular tool and configured to receive a signal corresponding to the aspect sensed by the sensor and further configured to control the actuator in response to the sensed signal to maneuver the end-effector to a function position with respect to the underlying manufactured item.

2. The modular tool of claim 1, wherein the aspect sensed by the sensor comprises detecting the presence of a hole in the underlying manufactured item wherein the function further comprises drilling the hole.

3. The modular tool of claim 1, wherein the aspect sensed by the sensor comprises detecting the presence of a joint between members of the underlying manufactured item wherein the function further comprises joining the members.

4. The modular tool of claim 1, wherein the aspect sensed by the sensor comprises detecting the presence of an edge of the underlying manufactured item wherein the function further comprises machining the edge.

5. The modular tool of claim 1, wherein the aspect sensed by the sensor comprises detecting the presence of a hole in the underlying manufactured item wherein the function further comprises measuring the hole and selecting an appropriate fastener for the measured hole.

6. The modular tool of claim 1, wherein the actuator is configured to be controlled by a master control system independent of the modular tool such that control of the actuator may be passed back and forth between the master control system and the local controller.

7. The modular tool of claim 1, further comprising a memory coupled to the local processor and configured to store calibration information about the sensed aspect.

8. The modular tool of claim 1, wherein the sensor comprises a laser measuring device.

9. The modular tool of claim 1, wherein the sensor comprises an ultrasonic measuring device.

10. A system, comprising:
    a plurality of self-contained modular devices, each self-contained modular device including:
    an actuator mount configured to removably engage an actuator suited to maneuver any modular tool coupled thereto;
    an interface configured to communicate with the actuator;
    an end-effector disposed in modular tool and configured to accomplish a manufacturing function, the end-effector further including a sensor configured to sense an aspect of an underlying manufactured item to which the manufacturing function is performed; and
    a local controller disposed in the modular tool and configured to receive a signal corresponding to the aspect sensed by the sensor and further configured to control the actuator in response to the sensed signal to maneuver the end-effector to a function position with respect to the underlying manufactured item; and
    a master control system configured to communicate with each self-contained modular device and further configured to control at least one actuator independent of any local controller.

11. The system of claim 10, wherein each self-contained modular device further comprises a motion actuator assembly configured to maneuver the respective end-effector under control of the respective local controller.

12. The system of claim 10, wherein each end-effector comprises one from the group comprised of: a drill assembly, a camera assembly, a hole-depth determining assembly, a counter-sink depth determining assembly, a fastener inserter assembly, a fastener installer assembly, a motion actuator assembly, a rotation motion assembly, an impact actuator assembly, and pivot motion assembly.

13. The system of claim 10, wherein each local controller comprises an electronic processor configured to execute computer instructions stored in a respective memory disposed in each respective self-contained modular device.

14. The system of claim 10, wherein at least one local controller is configured to communicate with at least one other local controller according to a hierarchy of control protocol with respect to each local controller present in the system.

15. The system of claim 10, wherein:
at least one local controller is further configured to receive an electronic start signal from the master control system that causes the at least one local controller to initiate the manufacturing function; and
the at least one local controller is further configured to send an electronic finish signal to the master control system or to at least one other local controller indicating that manufacturing function is accomplished.

16. The system of claim 10, wherein at least one of the plurality of self-contained modular devices further comprises a second end-effector configured to accomplish a second manufacturing function under control of the respective local controller.

17. A method, comprising:
maneuvering a self-contained modular manufacturing device to a first position with respect to an underlying manufactured item, the maneuvering controlled by a master controller remote from the self-contained modular manufacturing device;
indicating to the self-contained modular manufacturing device that the self-contained modular manufacturing device is in the first position;
assuming control of the self-contained modular manufacturing device with a local controller disposed in the self-contained modular manufacturing device;
sensing an aspect of the underlying manufactured item;
maneuvering a self-contained modular manufacturing device to a second position with respect to an underlying manufactured item in response to sensing the aspect;
accomplishing the manufacturing function, the accomplishing controlled by the local controller;
indicating to the master controller that the self-contained modular manufacturing device has accomplished the manufacturing function;
passing control of the self-contained modular manufacturing device back to the master control system; and
maneuvering the self-contained modular manufacturing device away from the first position, the maneuvering controlled by the master controller.

18. The method of claim 17, further comprising storing calibration information in a local memory about the maneuvering of the self-contained modular manufacturing device.

19. The method of claim 17, further comprising loading previously stored calibration information for accomplishing the manufacturing function from a local memory disposed in the self-contained modular manufacturing device prior to accomplishing the manufacturing function.

20. The method of claim 17, wherein the sensing the aspect further comprises one from the group comprised of: measuring the depth of a hole, measuring the diameter of a circular hole; measuring dimensions of a hole; measuring from an edge of a member; detecting a joint between members; measuring a temperature of an area of the underlying manufactured item; measuring distance between members; measuring distance between a member and the end-effector; and measuring a material strength characteristic of the underlying manufactured item.

* * * * *